(12) United States Patent
Chen et al.

(10) Patent No.: US 8,599,372 B2
(45) Date of Patent: Dec. 3, 2013

(54) LINEAR CHROMATIC CONFOCAL MICROSCOPIC SYSTEM

(75) Inventors: Liang-Chia Chen, Taipei (TW); Yong-Lin Wu, Taipei (TW); Yi-Wei Chang, Taipei (TW)

(73) Assignee: National Taipei University of Technology, Taipei (TW)

( * ) Notice: Subject to any disclaimer, the term of this patent is extended or adjusted under 35 U.S.C. 154(b) by 129 days.

(21) Appl. No.: 13/188,738

(22) Filed: Jul. 22, 2011

(65) Prior Publication Data

US 2012/0019821 A1 Jan. 26, 2012

(30) Foreign Application Priority Data

Jul. 23, 2010 (TW) ................................ 99124325 A

(51) Int. Cl.
*G01J 3/28* (2006.01)
(52) U.S. Cl.
USPC ........................................................ 356/300
(58) Field of Classification Search
USPC ......... 356/300, 302, 303, 602–609, 624, 614; 359/368, 385
See application file for complete search history.

(56) References Cited

U.S. PATENT DOCUMENTS

| | | | | |
|---|---|---|---|---|
| 4,965,441 A | * | 10/1990 | Picard | 250/201.3 |
| 5,165,063 A | * | 11/1992 | Strater et al. | 356/4.01 |
| 5,785,651 A | | 7/1998 | Kuhn et al. | |
| 5,880,846 A | * | 3/1999 | Hasman et al. | 356/602 |
| 6,674,572 B1 | * | 1/2004 | Scheruebl et al. | 359/368 |
| 7,567,350 B2 | * | 7/2009 | Cao et al. | 356/614 |
| 7,672,527 B2 | | 3/2010 | Arenberg et al. | |
| 7,813,788 B2 | * | 10/2010 | Zavislan et al. | 600/476 |
| 8,134,691 B2 | * | 3/2012 | Xie et al. | 356/4.04 |
| 2004/0051879 A1 | | 3/2004 | Schick | |
| 2010/0188742 A1 | * | 7/2010 | Chen et al. | 359/385 |

FOREIGN PATENT DOCUMENTS

EP 2124085 11/2009

\* cited by examiner

*Primary Examiner* — Kara E Geisel
(74) *Attorney, Agent, or Firm* — WPAT, PC; Justin King

(57) ABSTRACT

The present invention provides a chromatic confocal microscopic system in which two conjugate fiber modules are spatially configured and employed to conduct a detecting light from a light source and an object light reflected from an object, respectively. By means of the two spatially corresponding fiber modules, the detecting light is projected on the object and the reflected light from the object is entered into the other fiber module. Since each fiber of the fiber module is capable of filtering out the unfocused light and stray lights and allowing the focused light pass therethrough a line slit, thereby minimizing potential interference from light cross talk caused by the overlapped light spots, not only can the present invention obtain the information of surface profile of the object with high vertical measurement resolution, but also achieve high lateral resolution during confocal measurement.

15 Claims, 13 Drawing Sheets

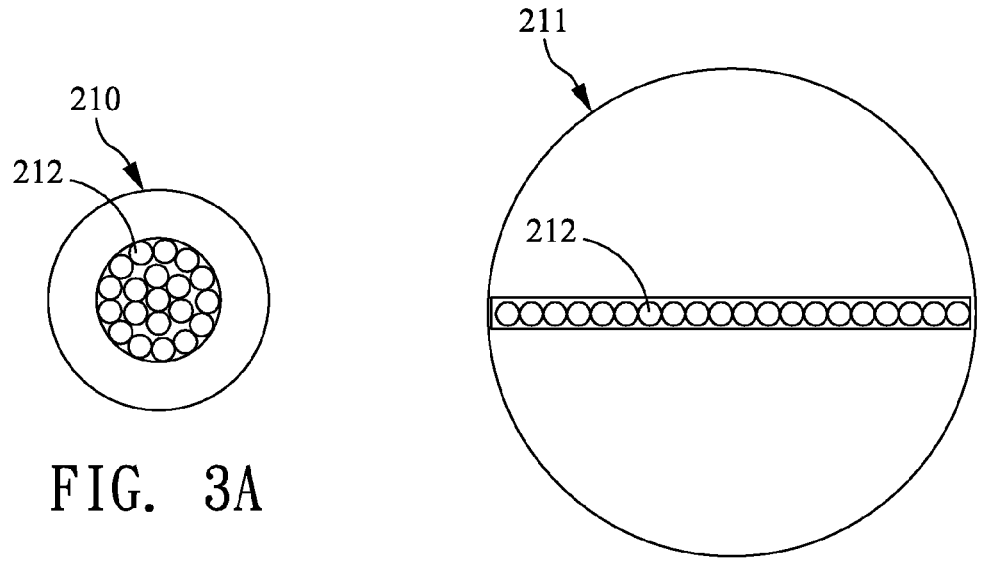
FIG. 3A
FIG. 3B
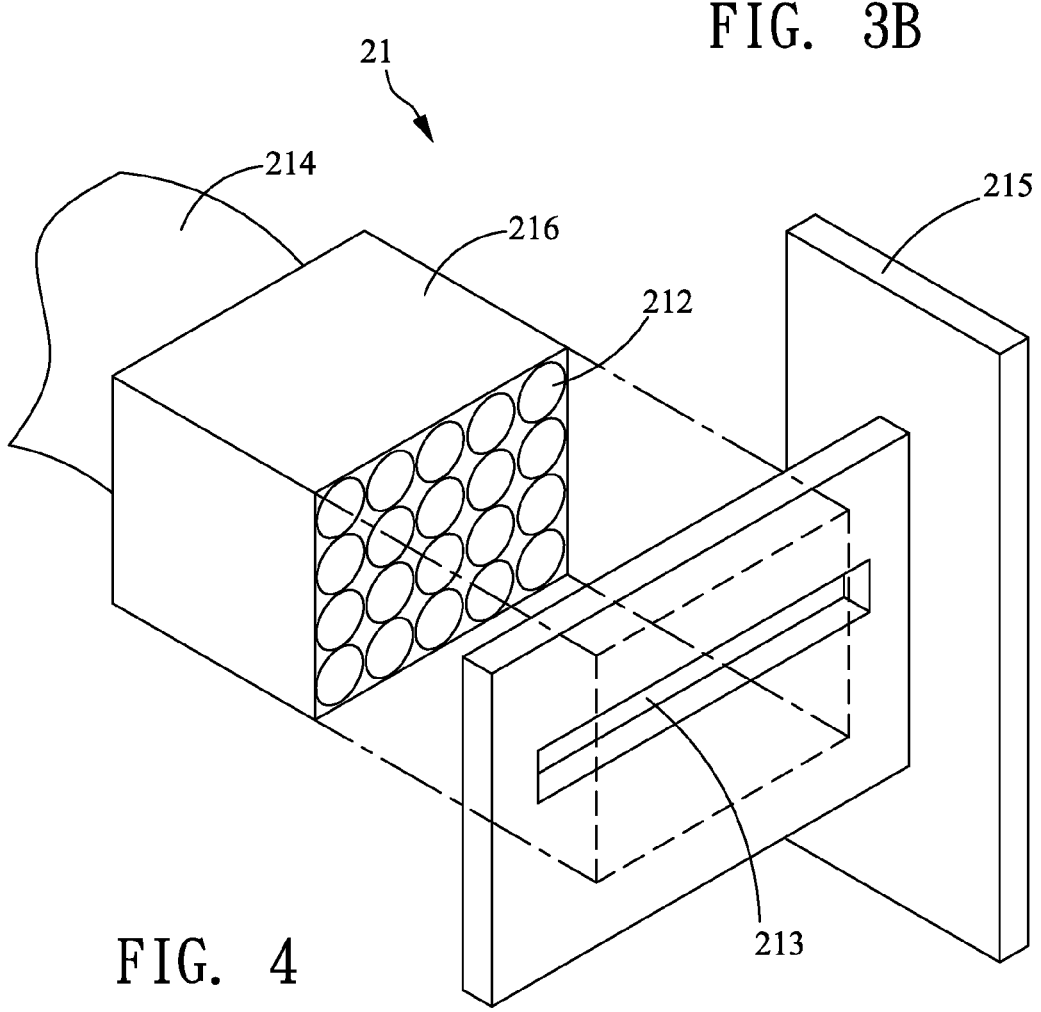
FIG. 4

LINEAR CHROMATIC CONFOCAL MICROSCOPIC SYSTEM

FIELD OF THE INVENTION

The present invention relates to a confocal microscopic technology, and, more particularly, to a linear chromatic confocal microscopic system.

BACKGROUND OF THE INVENTION

Conventional chromatic confocal microscopic system is generally disposed on a desktop for inspecting a surface profile of an object by performing a vertical or translational scanning. Since the conventional chromatic confocal microscopic systems are generally bulky, the space occupied by them may induce inaccessibility or difficulties for in-situ inspection or measurement. Further, if the inclination angle of the object surface is large, or the measurement space is limited, the optical measurement performance achieved by the conventional desktop-type chromatic confocal microscopic system may be significantly limited. For example, if it is required to measure a bump 3-D profile formed on a large-size wafer, due to the limitation of desk-type chromatic confocal microscopic system, it will not be capable for in-situ measurement.

Conventional art, such as US. Pub. No. 2004/0051879, disclosed a confocal displacement sensor for measuring a surface profile of an object. In such art, two measurement beams are created and the intensities of the two measurement beams are recorded by a light detector, respectively. An interpolation between the measured light intensities is performed to determine the profile depth. The height position of the scanned points of the surface can be calculated and the surface of the object can be measured simultaneously at a number of scanning points. Two planar light sources are preferably used for light generation and two planar high-resolution cameras are preferably for light detection.

In addition, U.S. Pat. No. 5,785,651 also disclosed a confocal microscopic apparatus for the quick and accurate determination of surface profile and depth, which comprises a polychromatic light source; a means for focusing the light onto a point of sample target, said means having a known amount of longitudinal chromatic light aberration; and a means for detecting the wavelengths of light reflected from the sample target. The light projected onto the sample target is focused according to wavelength due to the longitudinal chromatic light aberration. While light is reflected based on optical conjugate relationship between the object plane and the imaging plane, the light returning from the sample target is most strongly reflected in a specific wavelength that is focused on a reflective point on the sample, which is then detected through a pinhole locating on the focus plane and is analyzed to determine the surface depth by the means for detecting the wavelength of the reflected light. Furthermore, EP2124085 teaches a slit-scanning confocal microscope, having an illuminating optical system for forming the image of the light source on a sample; and an imaging optical system, which forms an image on line sensor arranged at a position optically conjugated to the light source by reflection light, transmitted light or fluorescence from the sample. The slit-like light source is divided into unit light sources, each of which has a size optically conjugated to a pixel of the line sensor. Moreover, U.S. Pat. No. 7,672,527 also disclosed an apparatus for generating chromatic dispersion through Fresnel lens.

In addition, please refer to the FIG. 1, in the conventional chromatic confocal microscopic system (hereinafter referred to as "conventional system"), a detected light generated by light source 10 is passed through a chromatic dispersion objective 11 and then is projected onto an object 12, thereby forming a reflected light from the object 12. The reflected light is received by a spectrum image sensing unit 13. The optical path of the light in the conventional system is so long (about 320 mm) that the intensity per unit area is reduced. Therefore, the spectrum image sensing unit 13 should have a long-exposure time so as to obtain enough light intensity for effectively performing confocal surface profile measurement. However, extending the exposure time will result in decreasing the measuring speed. In order to achieve high speed in-situ measurement, in the conventional system, it is necessary to arrange a high-power and multi-wavelength light source for increasing the intensity per unit area of light projected onto the object so that the exposure time of the spectrum image sensing unit can be reduced and rapidly acquiring the image associated with the object can be accomplished. However, although the foregoing high-power and multi-wavelength light source can help the conventional system to save exposure time effectively, the cost for making the system is too expensive to be operated practically and efficiently, thereby reducing the competitiveness thereof.

SUMMARY OF THE INVENTION

The present invention provides a linear chromatic confocal microscopic system having two corresponding optical fiber modules, wherein one optical fiber module is adopted to guide a light to project onto an object while the other optical fiber module is adopted to receive an object light reflected from the object. Since the optical fiber module for receiving the object light has a plurality of optical fibers, and each optical fiber performs a spatial filter for filtering out unfocused lights and stray lights, only focused light is allowed to pass therethrough so that potential interference of the noise of cross talk caused by the overlapped light spots is capable of being minimized. Accordingly, the present invention not only can obtain the information of surface profile of the object with high vertical measurement resolution, but also can achieve high lateral resolution during confocal measurement.

The present invention provides a chromatic confocal microscopic system combining a plurality of chromatic aberration lenses for modulating a line-type light field into an axial chromatic dispersion light and for focusing each reflected light onto the same plane so as to solve the problem of field curvature aberration, thereby simplifying the complexity of the linear chromatic dispersion system.

The present invention provides a chromatic confocal microscopic system which further has a focusing lens module coupled to the chromatic dispersion objective for shortening an optical path between the chromatic dispersion objective and image sensing unit as well as for enhancing optical light collection so as to increase optical intensity per unit sensing area, whereby the exposure time of the system for forming image and the volume of the system can be both reduced, thereby increasing optical efficiency, and reducing interference problem caused by stray lights.

In one exemplary embodiment, the present invention provides a linear chromatic confocal microscopic system, comprising: a light source for providing a detecting light; a first optical fiber module, having one end coupled to the light source, and the other end for modulating the detecting light into a modulated light; a chromatic dispersion objective, coupled to the first optical fiber module, having at least two chromatic aberration lenses for modulating the modulated light into an axial chromatic dispersion light projecting onto an object and reflected therefrom to form an object light, wherein the axial chromatic dispersion light comprises a plurality of sub line-type light fields having different focal lengths and corresponding wavelengths respectively; a second optical fiber module, having a plurality of optical fibers aligned linearly for being coupled to the chromatic dispersion objective so as to spatially filter the object reflected light, thereby forming a filtered light; a spectrum image sensing unit coupled to the second optical fiber module for sensing the filtered light so as to form a spectrum image; and an operation processing unit, electrically connected to the spectrum image sensing unit for receiving the spectrum image and performing a calculation to generate a line sectional profile with respect to the object profile.

In another exemplary embodiment, the chromatic dispersion objective further couples a focusing lens module for shortening a first optical path in which the detecting light enters the chromatic dispersion objective, and a second optical path in which the object light enters the spectrum image sensing unit, wherein the focusing lens module further comprises at least two optical lenses.

In another exemplary embodiment, an optical modulation module having a plurality of modulation elements being divided into a plurality of groups is disposed between the first optical fiber module and the chromatic dispersion objective, and the optical modulation elements of the optical modulation module are sequentially controlled through a way of periodical modulation so that the adjacent optical modulation elements cannot be actuated to reflect the detecting light emitted from the first optical fiber module to the chromatic dispersion objective at the same time, thereby modulating the detecting light into a time-sequential emitting light passing through the chromatic dispersion objective.

In another exemplary embodiment, an optical modulation module having a plurality of modulation elements being divided into a plurality of groups is disposed between the first optical fiber module and the light source, and the optical modulation elements of the optical modulation module are sequentially controlled through a way of periodical modulation so that the adjacent optical modulation elements cannot be actuated sequentially to reflect the detecting light being emitted from light source to the first optical fiber module at the same time, thereby modulating the detecting light into a time-sequential emitting light passing through the first optical fiber module.

Further scope of applicability of the present application will become more apparent from the detailed description given hereinafter. However, it should be understood that the detailed description and specific examples, while indicating exemplary embodiments of the disclosure, are given by way of illustration only, since various changes and modifications within the spirit and scope of the disclosure will become apparent to those skilled in the art from this detailed description.

BRIEF DESCRIPTION OF THE DRAWINGS

The present disclosure will become more fully understood from the detailed description given herein below and the accompanying drawings which are given by way of illustration only, and thus are not limitative of the present disclosure and wherein:

FIGS. 3A and 3B illustrates the cross-sections respectively with respect to two ends of the first optical fiber module according to the present invention;

FIG. 4 illustrates another embodiment of the first optical fiber module according to the present invention;

DETAILED DESCRIPTION OF THE INVENTION

For your esteemed members of reviewing committee to further understand and recognize the fulfilled functions and structural characteristics of the disclosure, several exemplary embodiments cooperating with detailed description are presented as follows.

Figure 1:
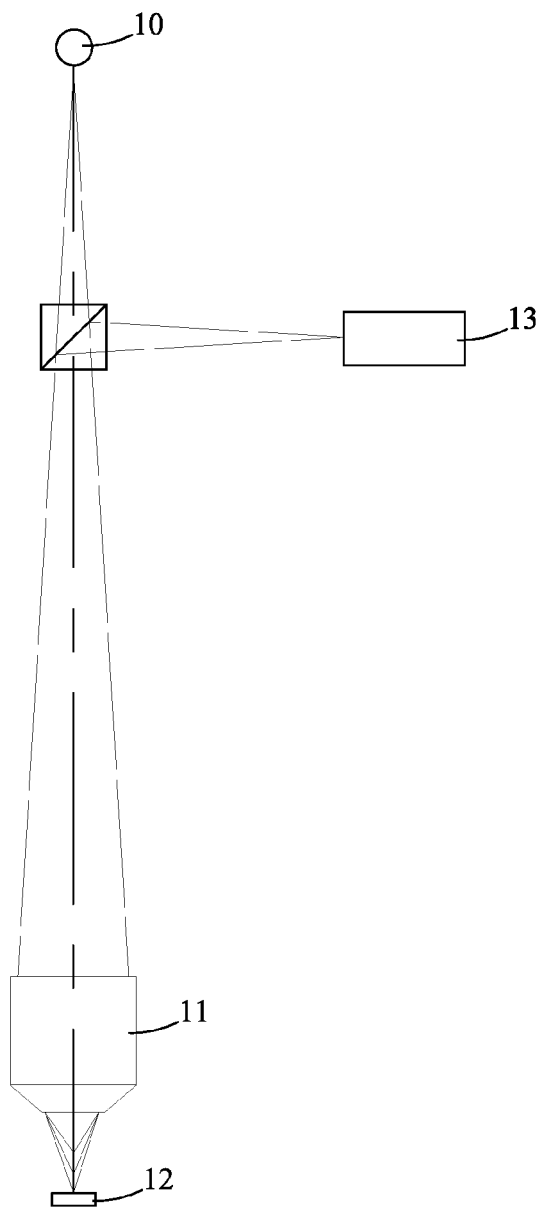
FIG. 1 illustrates an optical path of detecting light emitted from a light source and an optical path of object light reflected from the object in the conventional chromatic confocal microscopic system.
Figure 2:
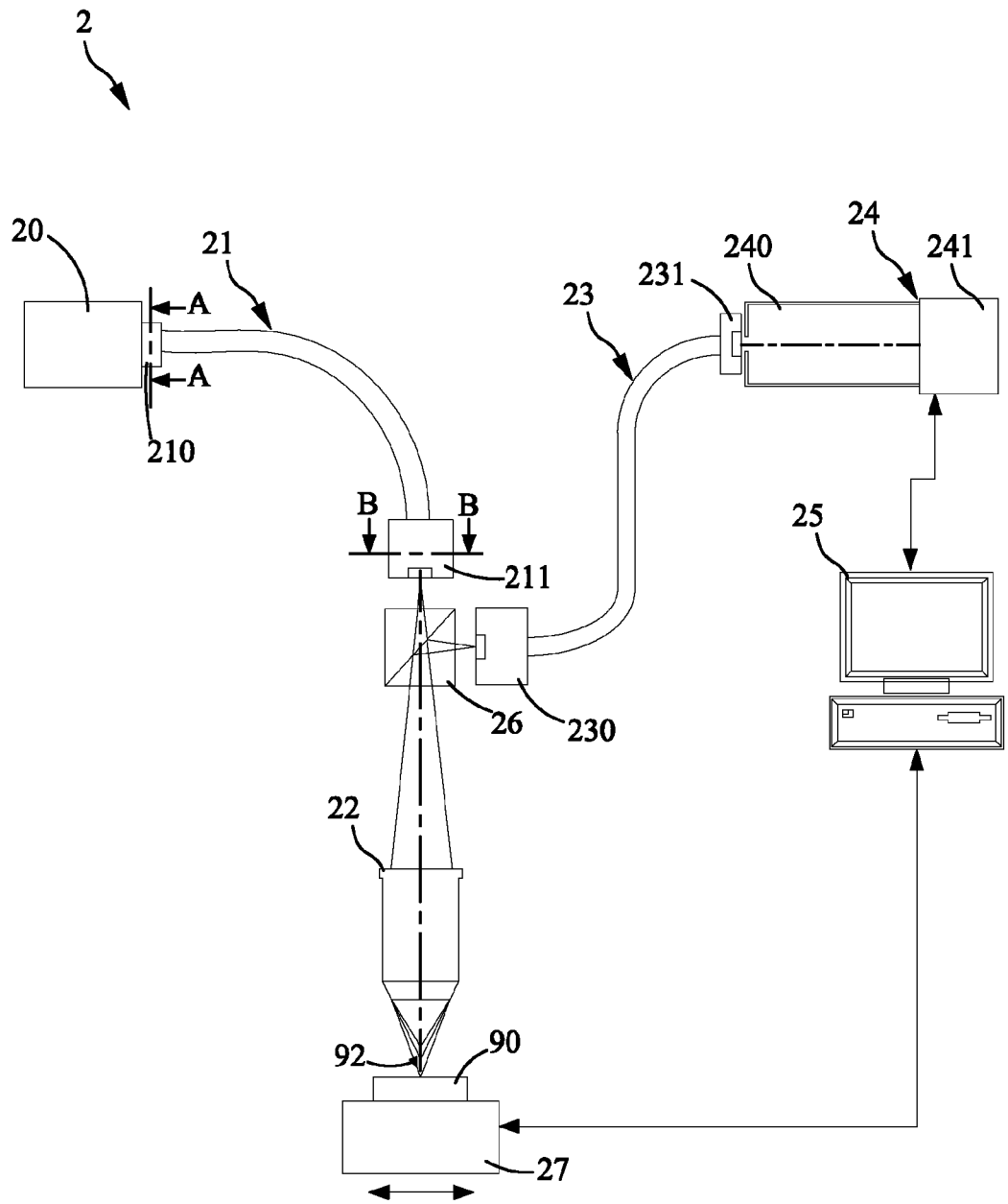
FIG. 2 illustrates an embodiment of the linear chromatic confocal microscopic system according to the present invention.

Please refer to FIG. 2, which illustrates an embodiment of the linear chromatic confocal microscopic system according to the present invention. The system 2 comprises a light source 20, a first optical fiber module 21, a chromatic dispersion objective 22, a second optical fiber module 23, a spectrum image sensing unit 24, and an operation processing unit 25. The light source 20 provides a detecting light, wherein, in the present embodiment, the light source 20 is a broadband light source for generating a broadband light beam having different wavelengths.

The first optical fiber module 21 has a first end and a second end, wherein the first end is coupled with the light source 20, and the second end modulates the detecting light into a modulated light. In the present embodiment, the modulated light is a linear light beam. In addition, in the present embodiment, the first fiber module 21 is an optical fiber bundle having a plurality of optical fibers, and the two ends of the first optical fiber module 21 has a terminal module 210 and 211, respectively, wherein the terminal module 210 is coupled to the light source 20, and the terminal module 211 is coupled to the chromatic dispersion objective 22. Please refer to FIG. 3A, wherein the plurality of optical fibers 212 are arranged in the terminal module 210 so that the one end of the plurality of optical fibers 212 form an area for coupling to the light source 20. In the present invention shown in FIG. 3A, a cross-section of the terminal module 210 for accommodating the plurality of optical fibers is a circular section, whereby the one end of the plurality of optical fibers 212 are arranged circularly to form a circular plane. It is noted that the shape of the cross-section of the terminal module will be determined by user's needs, and it would not be limited to the circular shape. In FIG. 3B, the terminal module 211 coupled to the chromatic dispersion objective has a line opening so that the other end of the plurality of optical fibers 212 can be arranged linearly within the line opening, whereby the detecting light emitted from the terminal module 211 is capable of being modulated into the linear light beam.

Please refer to FIG. 4, which illustrates an alternative of the first optical fiber module according to the present invention. In the present invention, the first optical fiber module 21 comprises a line slit 213, an optical fiber bundle 214, and a position adjusting unit 215. The line slit 213 coupled to the chromatic dispersion objective. One end of the optical fiber bundle 214 being coupled to the light source is similar to the embodiment illustrated in FIG. 3A, while the other end of the optical fiber bundle 214 is coupled to the line slit 213 by means of the terminal module 216, wherein the plurality of optical fibers 212 of the optical fiber bundle 214 are two-dimensionally arranged within the terminal module 216. The position adjusting unit 215 is coupled to the line slit 213, and is capable of performing at least two-dimensional linear movement for adjusting the relative position between the optical bundle 214 and the line slit 213 whereby one linearly arranged optical fibers of the two-dimensionally arranged optical fibers is capable of corresponding to the opening of the line slit 213. In one embodiment, the position adjusting unit 215 can be, but should not be limited to, a linear guide rail or linear motor having high-precision movement control for adjusting the relative position between the optical bundle 214 and the line slit 213, whereby a row of the optical fibers is corresponding to the opening of the slit 213 for modulating the detecting light into a linear light beam. It is noted that although the position adjusting unit 215 is coupled to the line slit 213 illustrated in FIG. 4, alternatively, the position adjusting unit 215 is capable of being coupled to the optical bundle 214 having the plurality of two-dimensionally arranged optical fibers or the terminal module 216 so as to adjust the position of the two-dimensionally arranged optical fibers, or position of the terminal module 216 such that one row of the optical fibers can be adjusted to be corresponding to the opening of the line slit 213.

Please refer to FIG. 2, in which the chromatic dispersion objective 22 is coupled to the first optical fiber module 21. In the present embodiment, a beam splitter 26 is disposed between the chromatic dispersion objective 22 and the first optical fiber module 21, wherein the detecting light passes through the beam splitter 26 to the chromatic dispersion objective 22, thereby further being projected onto an object 90 being disposed on a translation platform 27, and, meanwhile, the beam splitter 26 further reflects an object light from the object 90 to the second optical fiber module 23. The second optical fiber module 23 receives and transmits the object light to the spectrum image sensing unit 24. In the present embodiment, the chromatic dispersion objective 22 comprises at least two chromatic aberration lenses for modulating the linear light beam emitted from the first optical fiber module 21 into an axial chromatic dispersion light 92 projecting onto the object 90 and reflected from the object 90 to form the object light, wherein the axial chromatic dispersion light 92 comprises a plurality of sub line-type light fields having wavelength different from each other, respectively. The chromatic dispersion objective 22 can not only disperse the line-type light field axially to form the sub line-type light fields, but also focus the reflected sub line-type light fields from the object onto to the same focus plane, thereby solving the problem of field curvature aberration.

Figure 5A:
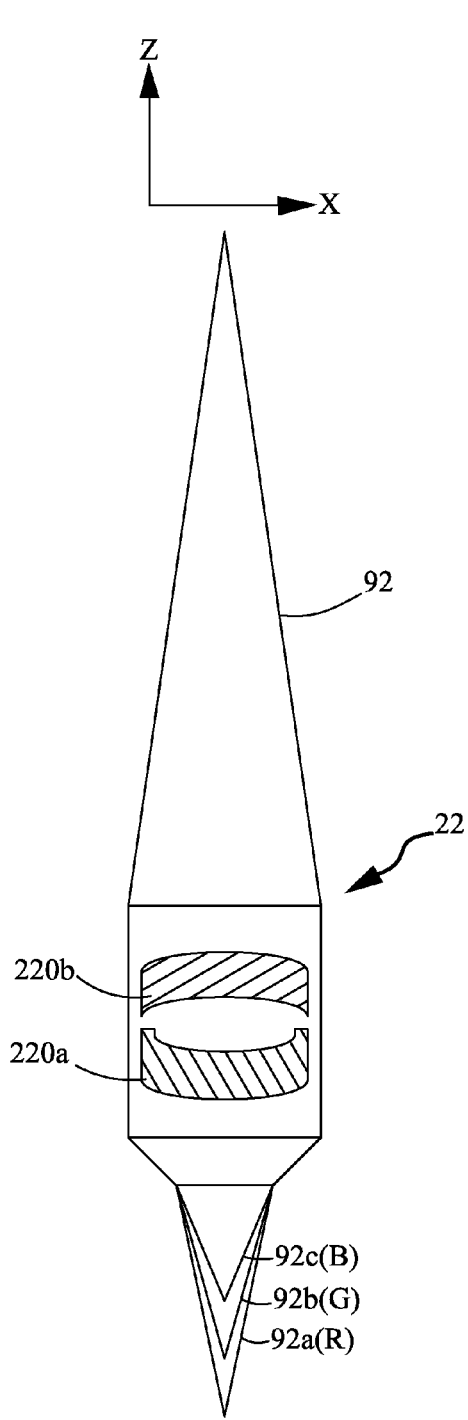
FIGS. 5A and 5B illustrate the cross-section of the chromatic dispersion objective according to the present invention, respectively.
Figure 5B:
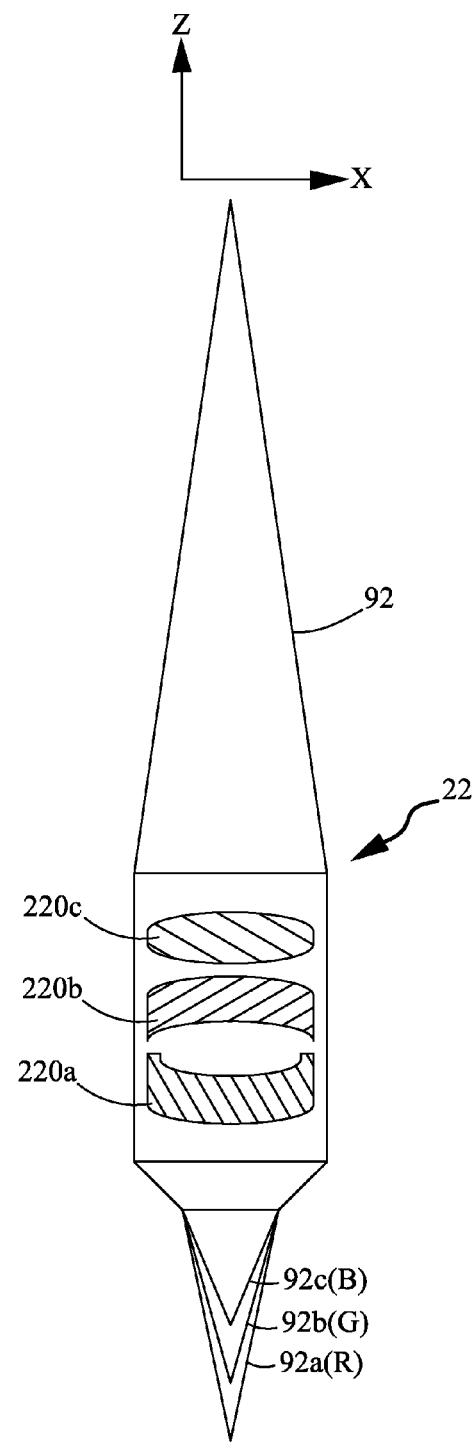

Please refer to FIGS. 5A, and 5B, which respectively illustrates a cross-section structure of the chromatic dispersion objective according to the present invention. In the embodiment shown in FIG. 5A, two chromatic aberration lenses, 220a and 220b, are utilized to form the optical mechanism of the chromatic dispersion objective 22, while in the embodiment shown in FIG. 5B, three chromatic aberration lenses 220a~220c are utilized to form the optical mechanism of the chromatic dispersion objective 22. Please refer to FIG. 5A or 5B, the chromatic dispersion objective 22 disperses the line-type light field 92 axially for forming a plurality of sub line-type light fields 92a, 92b, and 92c having different focal length and wavelength from each other, respectively. In the present embodiment, for easy explanation, the plurality of sub line-type light fields are shown by utilizing the red light field (R) 92a, green light field (G) 92b, and blue light field (B) 92c. It is noted that, the plurality of sub line-type light fields 92a, 92b, and 92c form a continuous spectrum, which can be a visible spectrum or a non-visible spectrum.

Figure 6A:
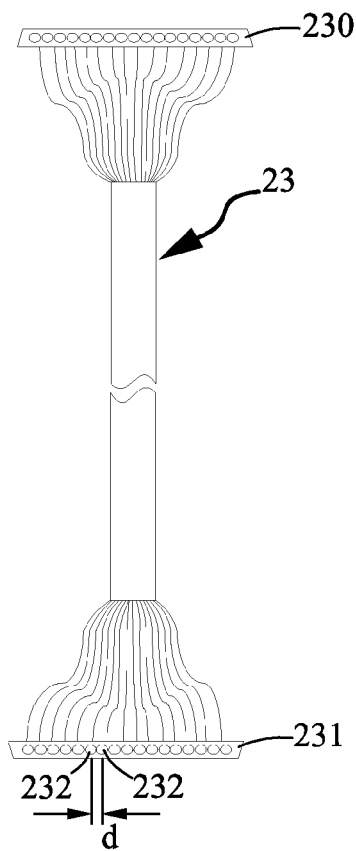
FIG. 6A illustrates the second optical fiber module according to the present invention.
Figure 6B:
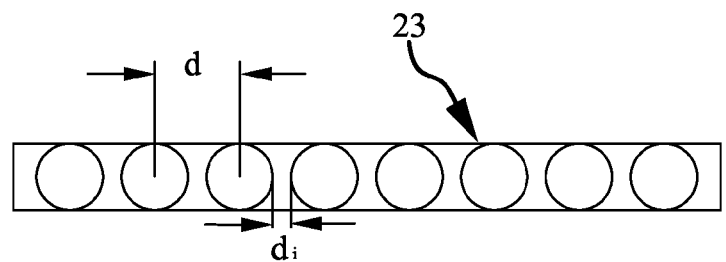
FIG. 6B illustrates another embodiment of the second optical fiber module according to the present invention.

Please refer to FIG. 6A, which illustrates a second optical fiber module according to the present invention. The second optical fiber module 23 has an optical fiber bundle having two ends coupled to the chromatic dispersion objective and the spectrum image sensing unit, respectively, by means of terminal modules 230 and 231. The second optical fiber module 23 is utilized to spatially filter the object light reflected from the object, thereby forming a filtered light. The optical fiber bundle has a plurality of optical fibers 232. In the embodiment shown in FIG. 6A, the one end of the optical fibers 232 are linearly arranged within the terminal module 230, while the other end of the optical fibers 232 are also linearly arranged within the terminal module 231, wherein the center distance between two adjacent optical fibers 232 is d. As shown in FIG. 6B, a specific center distance $d_i$ between two adjacent optical fibers 232 is further arranged properly so as to minimize the effect of cross talk.

Figure 7B:
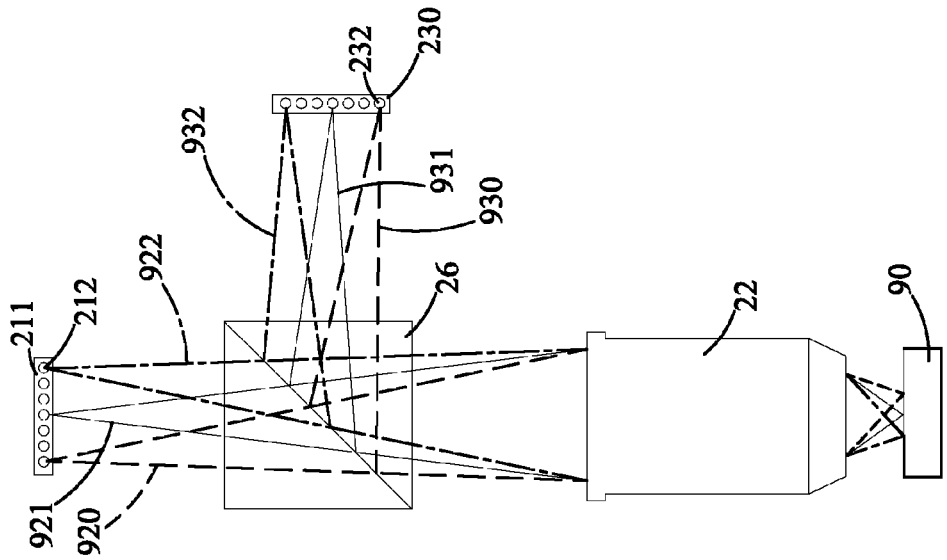
FIGS. 7A and 7B illustrate the conjugate relationship between the first optical fiber module and the second optical fiber module, respectively.
Figure 7A:
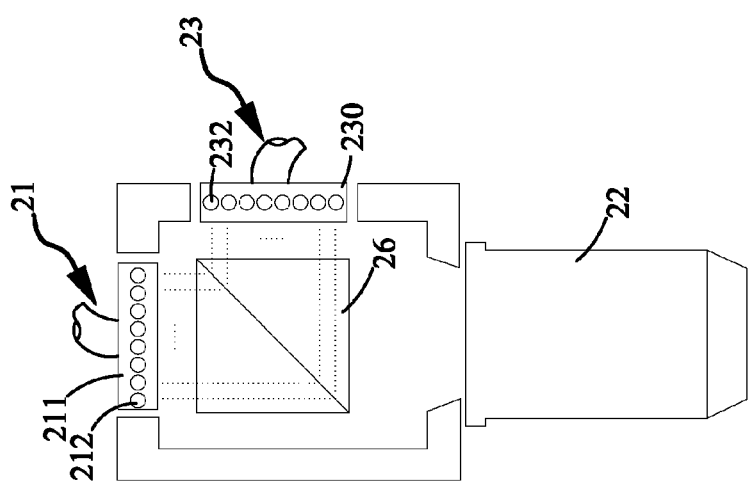

Please refer to FIGS. 7A, and 7B, which illustrates a conjugating relationship between the first and second optical fiber modules according to the present invention. In the present embodiment, the linearly arranged optical fibers 212 of the first optical fiber module 21 being coupled to the chromatic dispersion objective 22 are spatially corresponding to the linearly arranged optical fibers 232 of the second optical fiber module 23 which is optically coupled to the chromatic dispersion objective 22. The light emitted from each optical fiber 212 of the first optical fiber module 21 is projected onto the object 90 and then reflected therefrom so as to form the object light. The reflected object light then enters the optical fiber 232 which is conjugate to the optical fiber 212. Since the optical fibers 212 have the conjugate relation with respect to the optical fibers 232, the optical fiber 232 is capable of filtering out the unfocused lights and stray lights, and allowing focused light passing therethrough, thereby achieving effect of confocal microscopy.

Figure 8:
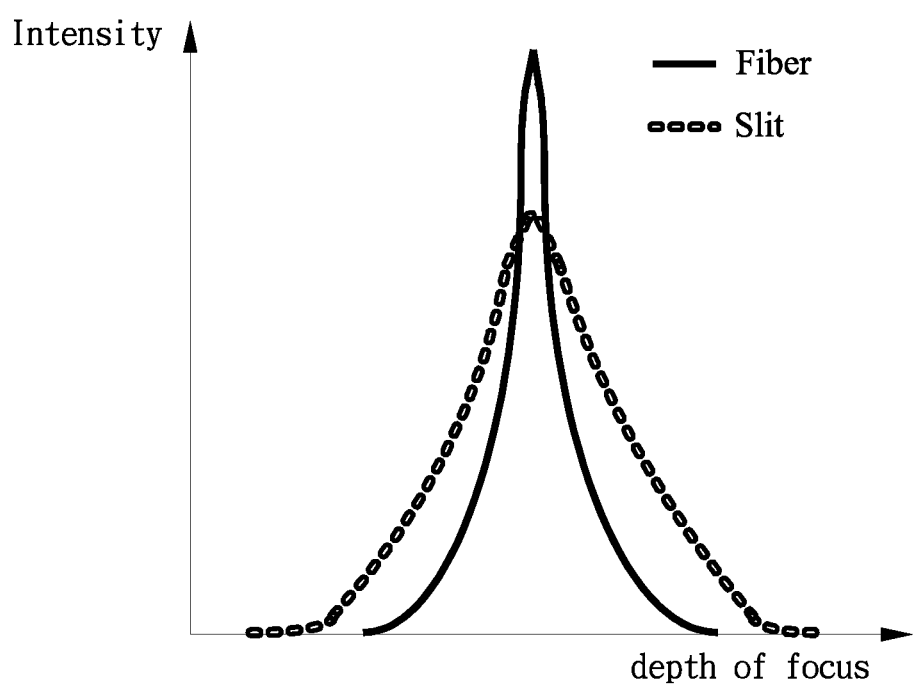
FIG. 8 illustrates depth-focus response curves of spatial filters respectively formed by linearly arranged optical fibers and line slit.

In FIG. 7B, after adjusting the conjugate relation between the optical fibers 212 and 232, the detecting light passing through the linearly arranged optical fibers 212 will be modulated into the linear light beams 920, 921, and 922 passing through the beam splitter 26 and then entering the chromatic dispersion objective 22 so as to project onto the object 90. Since the optical fibers 232 in the terminal module 230 of the second optical fiber module 23 are linearly arranged to optically couple to the chromatic dispersion objective 22, the object lights reflected from the object 90 can be focused on the end surface of the optical fibers 232, whereby the object lights 930, 931, and 932 are capable of entering the optical fibers 232. Accordingly, due to the linearly arranged optical fibers 232 of the second optical fiber module 23, the second optical fiber module 23 possesses the capability similar to the point-type confocal microscope, so that the noises of cross talk potentially induced by overlapped light spots generated from conventional slit can be minimized, thereby increasing lateral resolution of the confocal microscope. In FIG. 7B, object lights reflected from the surface of the object 90 are received by the optical fibers 232 in the terminal module 230 of the second optical fiber module 23, and only the object lights focused on the end surface of the optical fibers 232 can enter the optical fibers 23, thereby forming a filtered light. Please refer to FIG. 8, which illustrates depth-focus response curves of spatial filters respectively formed by linearly arranged optical fibers and line slit. From FIG. 8, it is capable of observing that the full width half maximum (FWHM) associated with the spatial filter formed by linear arranged optical fibers is obviously smaller than the FWHM associated with the spatial filter formed by line slit. Accordingly, the utilization of linearly arranged optical fiber can be more simple and accurate so that the resolution and accuracy of profile measurement can be improved effectively.

Please refer back to FIG. 2, the spectrum image sensing unit 24 senses the filtered light emitted from the second optical fiber module 23 for forming a spectrum image. In the present embodiment, the spectrum image sensing unit 24 further comprises a light dispersion module 240, and an image sensor 241. The light dispersion module 240 is coupled to the second optical fiber module 23 for dispersing the filtered light. In the present embodiment, the light dispersion module 240 is coupled to the terminal module 231 of the second optical fiber module 23. The image sensor 241 is coupled to the light dispersion module 240 for sensing the dispersed filtered light so as to form the spectrum image. The operation processing unit 25 is electrically connected to the spectrum image sensing unit 24 for receiving the spectrum image and synchronously performing a calculation to generate a line sectional profile with respect to the object. The operation processing unit 25 also electrically connected to the translation platform 27 for controlling the movement of the translation platform 27, whereby the object 90 can pass the chromatic dispersion objective 22 with the translation movement of the platform so that the linear light beams 92 emitted from the chromatic dispersion objective 22 can scan the surface of the object 90 for measuring the surface profile of the object 90. By means of the foregoing operation, the area surface profile of the object 90 can be completely measured only by means of the one dimensional translation of the object 90. As to the light dispersion module 240 and image sensor 241, since the operation and principle thereof are belonging to conventional arts, it will not be further described hereinafter.

Figure 9:
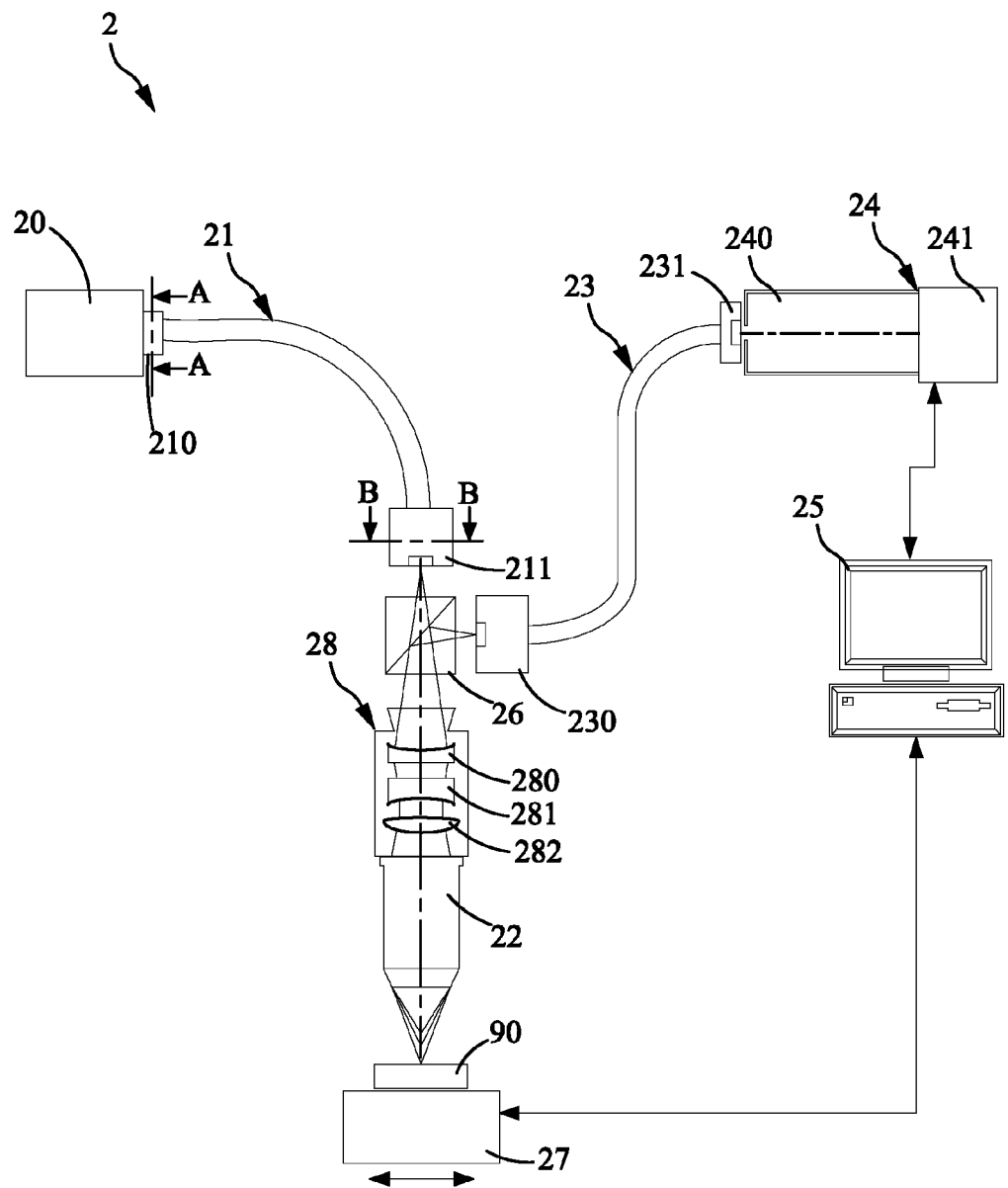
FIG. 9 illustrates another embodiment of the chromatic confocal microscope according to the present invention.

Please refer to FIG. 9, which illustrates another embodiment of the chromatic confocal microscope according to the present invention. In the present embodiment, the architecture is basically similar to the embodiment shown in FIG. 2, wherein the difference is that the system shown in FIG. 9 further comprises a focusing lens module 28 disposed between the chromatic objective 22 and the beam splitter 26 for shortening a first optical path in which the detecting light enters the chromatic dispersion objective 22, and a second optical path in which the object light enters the spectrum image sensing unit 24. In addition to the first optical path and the second optical path being massively shortened, meanwhile, the intensity per unit area of light projected onto the object 90 can be increased as well so that not only can the exposure time of the spectrum image sensing unit 24 be reduced, but also can the spatial volume of the system be minimized, thereby increasing optical efficiency, and reducing interference problem caused by stray lights. In the present invention, the focusing lens module 28 has at least two optical lenses 280~282, being combined for increasing the light intensity. It is noted that the lens material for forming the optical lens 280, 281, or 282 is selected from the lens materials that will not affect the imaging quality, chromatic light aberration, and dispersion range of the system. In the present embodiment, the material having higher Abbe number such as SF11 and N-BK7 is preferred. Meanwhile, by means of the curvature combination of the optical lenses 280~282, the chromatic light aberration can be reduced to a minimum level, so that the focal range of the dispersed lights will not be changed. In the present embodiment, the focusing lens module 28 is formed by two planoconcave lenses 280 and 281, and a biconvex lens 282. It is noted that the material for foregoing optical lenses is determined according to the need of the user, and it should not be limited by the above described exemplary materials.

Figure 10A:
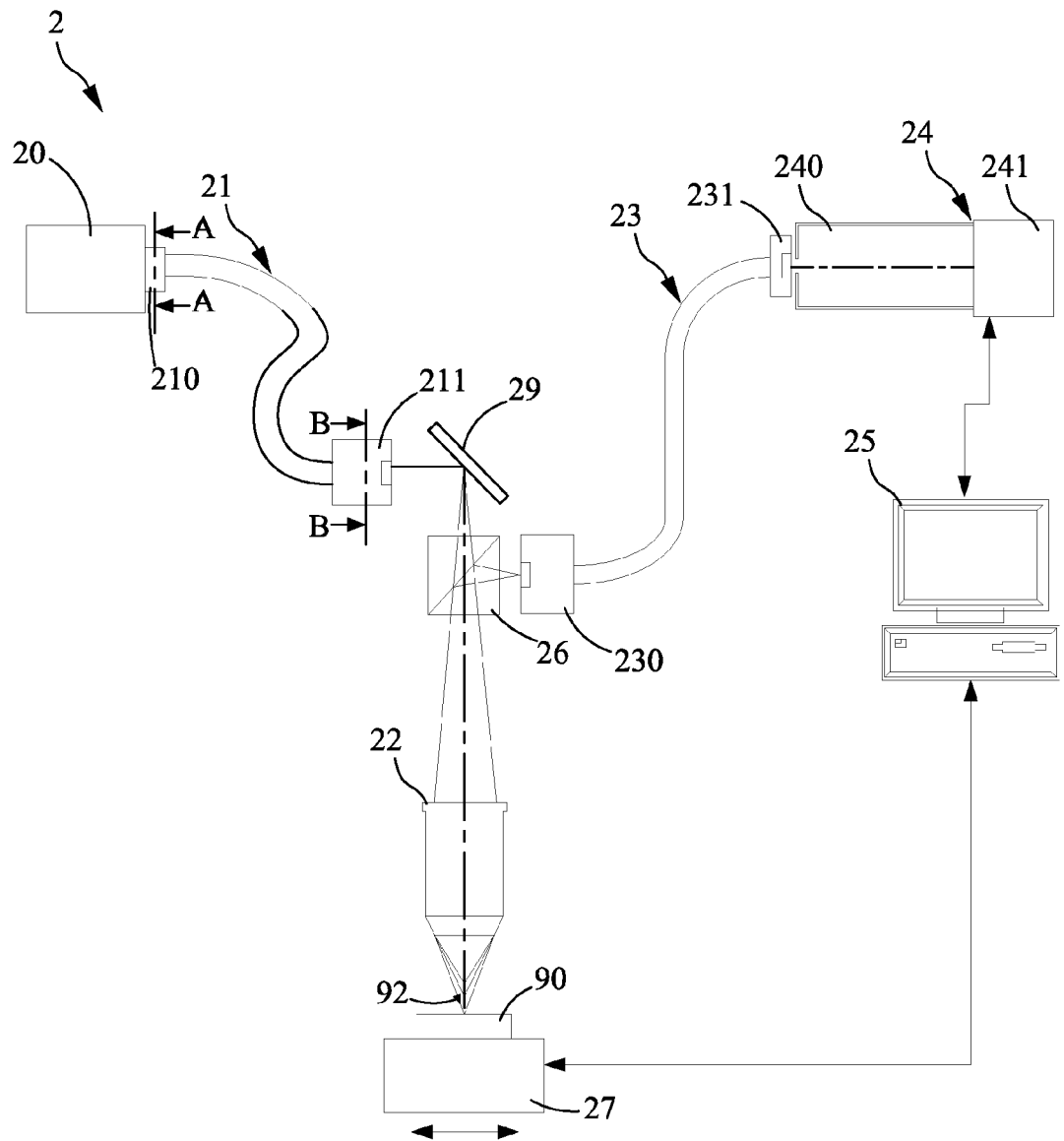
FIGS. 10A and 10B illustrate a further embodiment of the chromatic confocal microscope according to the present invention.

Please refer to FIG. 10A, which illustrates a further embodiment of the chromatic confocal microscope according to the present invention. In the present embodiment, the architecture shown in FIG. 10A is basically similar to the embodiment shown in FIG. 2, wherein the difference is that the system further comprises an optical modulation module 29 disposed between the first optical fiber module 21 and the chromatic dispersion objective 22 for reducing the effect of light cross talk. The optical modulation module 29 can be, but should not be limited to, a digital micromirror device (DMD), or a liquid crystal on silicon (LCOS).

Figure 11A:
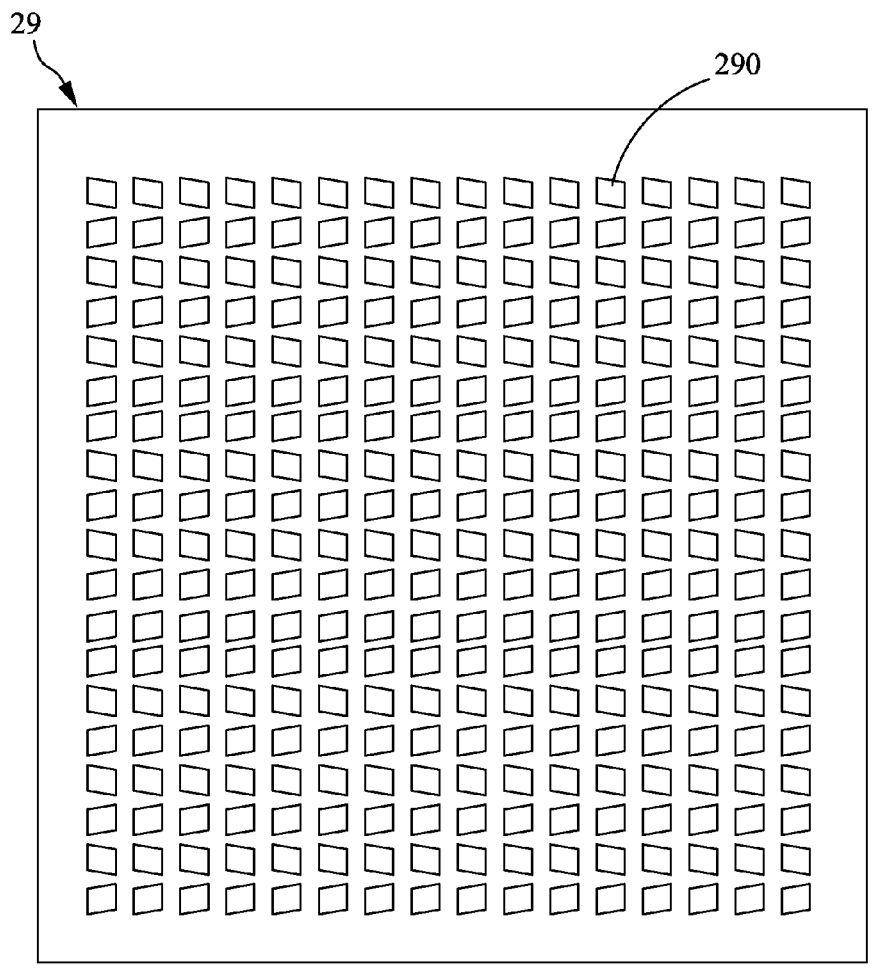
FIG. 11A illustrates the arrangement of the plurality of the micro reflectors of the DMD.
Figure 11B:
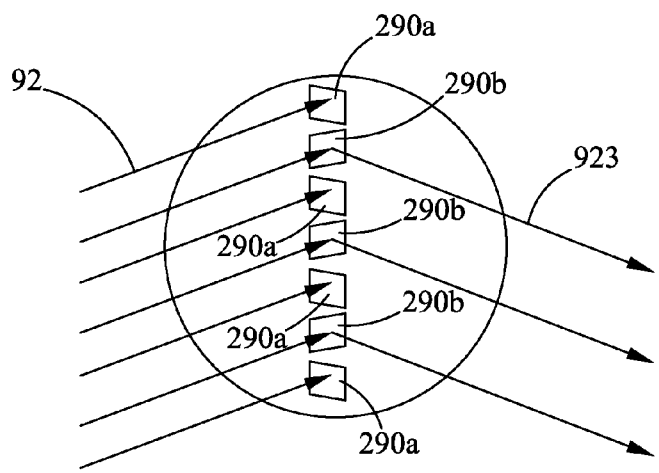
FIG. 11B illustrates the changing tilt angle of the reflecting mirror.

Please refer to FIG. 11A, which illustrates the arrangement of the plurality of the micro reflectors of the DMD. In the present embodiment, the optical modulation module 29 formed by DMD comprises a plurality of optical modulation elements 209 (reflecting mirrors) being arranged two-dimensionally and the tilt angle of each reflecting mirrors 290 is capable of being adjusted. Please refer to FIG. 11B, which illustrates the changing tilt angle of each reflecting mirror. In the embodiment shown in FIG. 11B, reflecting mirrors 290*a* are controlled to reflect the light 923 to other places, while only reflecting mirrors 290*b* are controlled to reflect the light 923 to the chromatic dispersion objective (not shown).

Figure 12:
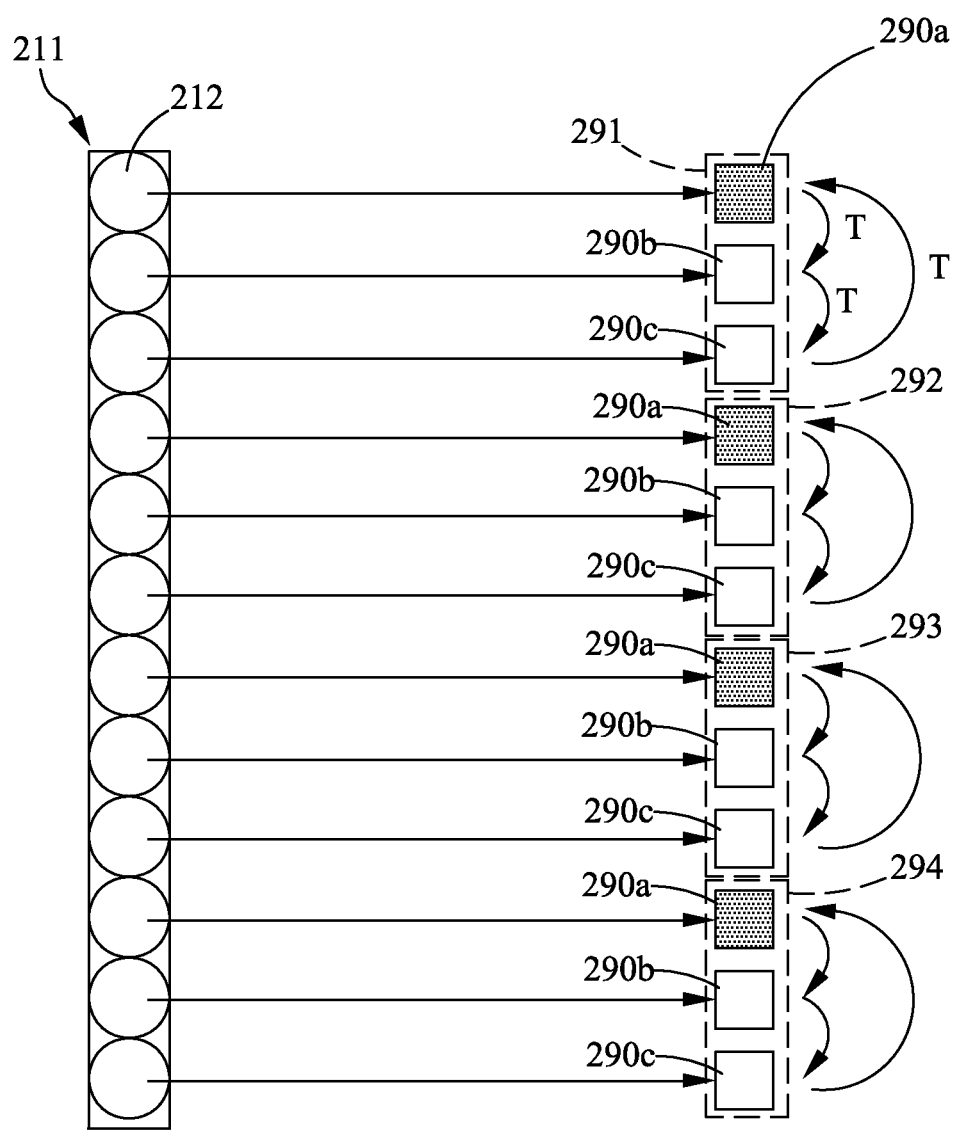
FIGS. 12 and 13 illustrate the relationship between the optical modulation elements of the optical modulation module and the optical fibers of the first optical module, and situation that the optical modulation elements reflect the light, respectively.

In order to obtain good spatial resolution of measurement and reduce effect of the light cross talk, as shown in FIG. 12, the plurality of optical modulation elements 290*a*~290*c* of the optical modulation module 29 are divided into a plurality of groups 291~294, wherein each optical modulation element 290*a*, 290*b*, or 290*c* is corresponding to one optical fiber 212 in the terminal module 211 of the first optical fiber module. A periodical modulation is utilized to control each optical modulation element 290*a*, 290*b*, or 290*c* of each group 291~294, so that each optical modulation element 290*a*, 290*b*, or 290*c* is capable of reflecting the linear light beam one by one emitted from the specific optical fibers 212 to the chromatic dispersion objective 22. The periodical modulation is performed, for example, by adjusting the tilt angle of each optical modulation element 290*a* in each group 291~294 synchronously at a first time point $t_0$, thereby reflecting the light emitted from the optical fibers 212 corresponding to the optical modulation element 290a in each group 291~294 to the chromatic dispersion objective 22, while the tilt angle of the optical modulation elements 290b and 290c in each optical modulation group 291~294 are adjusted synchronously to another angle, so that the light emitted from the optical fibers 212 corresponding to the optical modulation element 290b and 290c in each group 291~294 will not enter the chromatic dispersion objective 22. After a specific time period T being passed, the tilt angle of each optical modulation elements 290b in each group 291~294 are controlled synchronously to reflect the light emitted from the corresponding optical fibers 212 to the chromatic dispersion objective, while the tilt angle of the optical modulation elements 290a and 290c in each optical modulation group 291~294 are adjusted synchronously to another angle, so that the light emitted from the optical fibers 212 corresponding to the optical modulation element 290a and 290c in each group 291~294 will not enter the chromatic dispersion objective 22. Similarly, after another time period T being passed, the tilt angle of each optical modulation elements 290c in each group 291~294 are controlled synchronously to reflect the light emitted from the corresponding optical fibers 212 to the chromatic dispersion objective 22, while the tilt angle of the optical modulation elements 290a and 290b in each optical modulation group 291~294 are adjusted synchronously to another angle that the light emitted from the optical fibers 212 corresponding to the optical modulation element 290a and 290b in each group 291~294 will not enter the chromatic dispersion objective 22. Finally, after passing a further time period T, the tilt angle of each optical modulation elements 290a is controlled to reflect the light to enter the chromatic dispersion objective 22, thereby completely finishing the periodical modulation. Thereafter, the procedure of the periodical modulation is performed continuously and the procedure will not be stopped until the image is acquired.

Figure 10B:
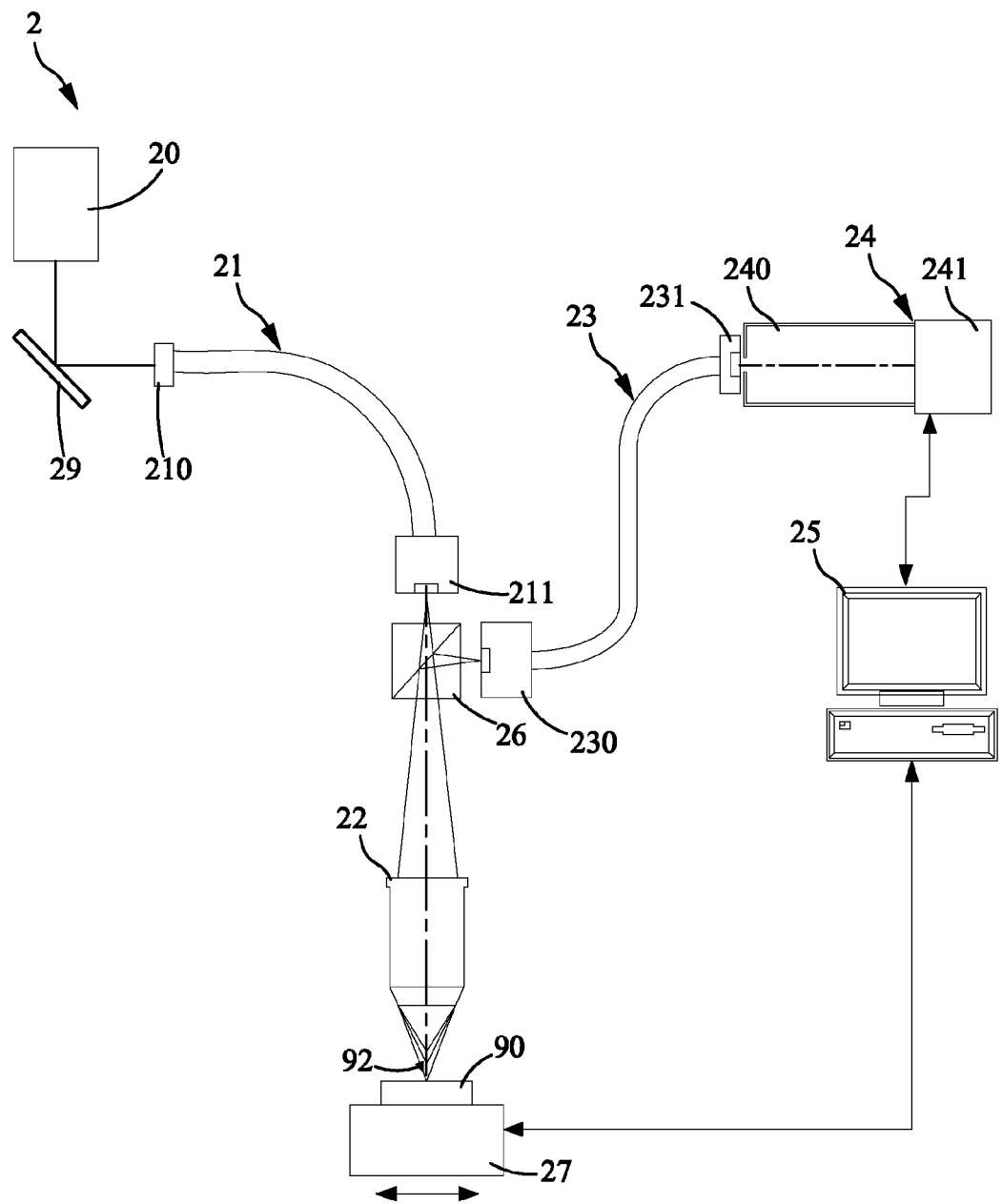
Figure 13:
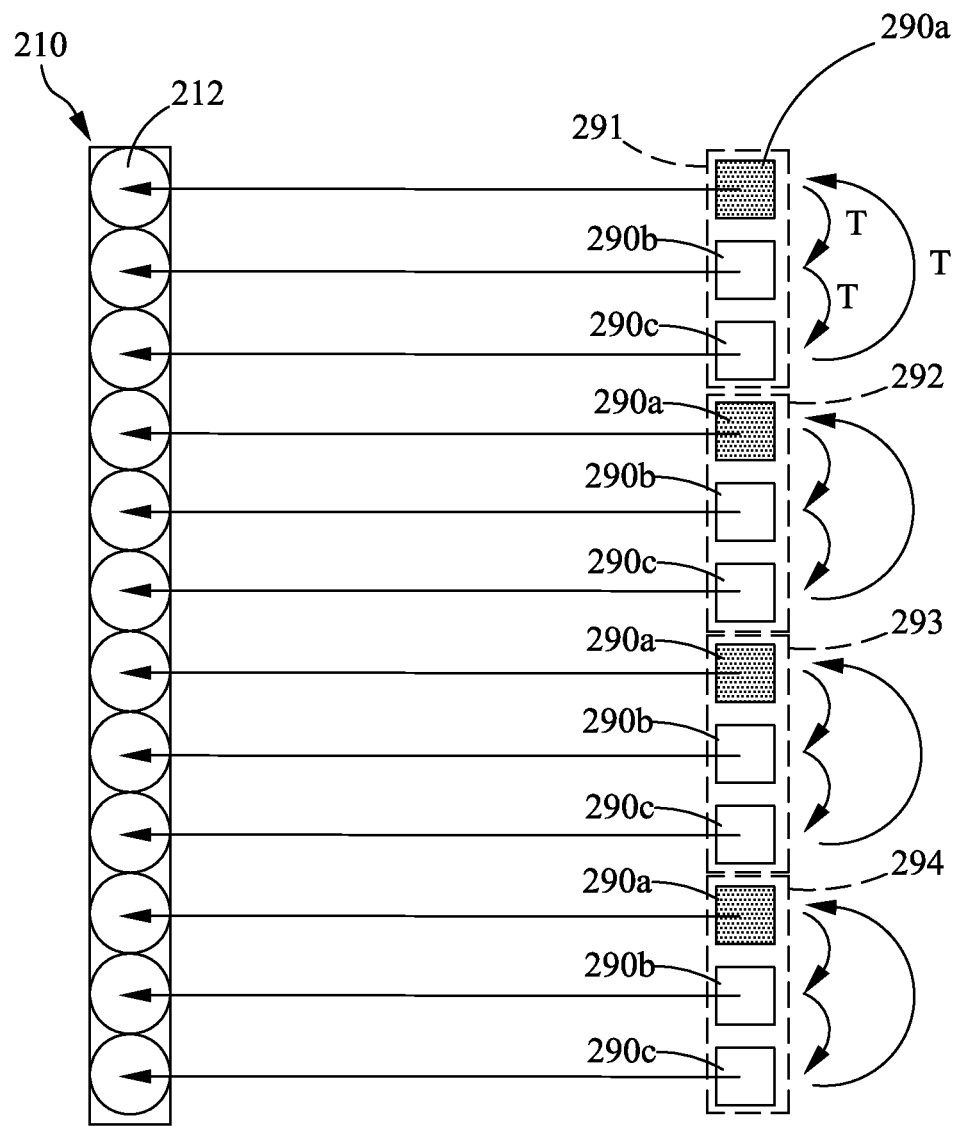

By means of the way of light projecting shown in FIG. 12, the adjacent optical modulation elements are controlled to reflect light separately so as to prevent adjacent optical modulation elements from reflecting lights at the same time, thereby reducing the effect of light cross talk happened around the adjacent optical modulation elements. Accordingly, the optical fibers arranged in the second optical fiber module 23 will not be limited to either arrangement shown in FIG. 6A or FIG. 6B, because the periodical modulation control can prevent the light cross talk from being occurred between adjacent optical fibers, thereby maintaining the imaging quality. In addition, as shown in FIG. 10B, the optical modulation module 29 can also be disposed between the light source 20 and terminal module 210 of the first optical fiber module 21. In the embodiment shown in FIG. 10B, the optical modulation module 29 has a plurality of optical modulation elements shown in FIG. 13, wherein each row or column of the optical modulation elements 290a~290c corresponding to the optical fibers 212 are divided into a plurality of groups 291~294. Likewise, the optical modulation elements 290a~290c in each group are respectively controlled by means of the periodical modulation described above for generating a time-sequential emitting light entering the optical fibers disposed in the terminal module 210 of the first optical fiber module 21. The time-sequential emitting light is guided to the beam splitter 26 by means of the first optical fiber module 21. According to the optical control for guiding the light shown in FIG. 13, the periodical modulation is utilized to actuate the optical modulation elements 290a~290c separately, thereby preventing adjacent optical modulation elements from reflecting lights at the same time so as to eliminate light cross talk generated around the two adjacent optical modulation elements. In addition, in the embodiment shown in FIG. 10A and FIG. 10B, the focusing lens module 28 is also preferred to be utilized for shortening the optical path in which the detecting light entering the chromatic dispersion objective and shortening the optical path in which the object light entering the spectrum image sensing unit.

There has thus shown and described a novel linear chromatic confocal microscopic system. Many changes, modifications, variations and other uses and application of the subject invention will become apparent to those skilled in the art after considering this specification and the accompanying drawings. All such changes, modifications, variations, uses, and applications are covered by the scope of this invention which is limited only by the appended claims.

What is claimed is:

1. A linear chromatic confocal microscopic system, comprising:
   a light source for providing a detecting light;
   a first optical fiber module, having one end coupled to the light source, and the other end for modulating the detecting light into a modulated light;
   a chromatic dispersion objective, coupled to the first optical fiber module, having at least two chromatic aberration lenses for modulating the modulated light into an axial chromatic dispersion light projecting onto an object and reflected from the object to form an object light, wherein the axial chromatic dispersion light comprises a plurality of sub line-type light fields having different focal lengths and corresponding wavelengths, respectively;
   a second optical fiber module, having a plurality of second optical fibers aligned linearly for being coupled to the chromatic dispersion objective so as to spatially filter the object light, thereby forming a filtered light;
   a spectrum image sensing unit coupled to the second optical fiber module for sensing the filtered light so as to form a spectrum image; and
   an operation processing unit, electrically connected to the spectrum image sensing unit for receiving the spectrum image and performing a calculation to generate a line-type sectional profile with respect to the object;
   wherein the first optical fiber module has a plurality of first optical fibers linearly arranged to couple with the chromatic dispersion objective, and each first optical fiber optically coupled to the chromatic dispersion objective is conjugate to each corresponding second optical fiber linearly coupled to the chromatic dispersion objective.

2. The system of claim 1, wherein the plurality of the first optical fibers of the first optical fiber module are arranged to form an area for coupling to the light source.

3. The system of claim 1, wherein two ends of the first optical fiber module respectively has a terminal module, wherein the one terminal module is coupled to the light source, and the other terminal module is coupled to the chromatic dispersion objective, and the terminal module coupled to the chromatic dispersion objective has a line-type opening so that the end of the plurality of the first optical fibers are arranged linearly within the line-type opening.

4. The system of claim 1, wherein the chromatic dispersion objective further couples a focusing lens module for shortening a first optical path in which the detecting light enters the chromatic dispersion objective, and a second optical path in which the object light enters the spectrum image sensing unit.

5. The system of claim 4, wherein the focusing lens module further comprises at least two optical lenses.

6. The system of claim 1, wherein the spectrum image sensing unit further comprises:
a light dispersion module, coupled to the second optical fiber module, for dispersing the filtered light; and
an image sensor, coupled to the light dispersion module, for sensing the dispersed filtered light so as to form the spectrum image.

7. The system of claim 1, further comprising a translation platform for carrying the object and performing at least one dimensional movement so that a surface profile of the object is measured by one dimensional movement of the translation platform.

8. The system of claim 1, wherein the plurality of the second optical fibers are linearly arranged to couple to the spectrum image sensing unit.

9. The system of claim 8, wherein the two adjacent second optical fibers are disposed a predetermined space apart from each other.

10. The system of claim 1, wherein an optical modulation module having a plurality of modulation elements divided into a plurality of groups is disposed between the first optical fiber module and the chromatic dispersion objective, and the optical modulation elements of the optical modulation module are sequentially controlled through a way of periodical modulation so that the adjacent optical modulation elements can be actuated one by one sequentially to reflect the detecting light emitted from the first optical fiber module to the chromatic dispersion objective, thereby modulating the detecting light into a time-sequential emitting light passing through the chromatic dispersion objective.

11. The system of claim 10, wherein the optical modulation module is a digital micromirror device, or a liquid crystal on silicon device.

12. The system of claim 1, wherein an optical modulation module having a plurality of modulation elements being divided into a plurality of groups is disposed between the first optical fiber module and the light source, and the optical modulation elements of the optical modulation module are sequentially controlled through a way of periodical modulation so that the adjacent optical modulation elements can be actuated one by one sequentially to reflect the detecting light emitted from light source to the first optical fiber module at the same time, thereby modulating the detecting light into a time-sequential emitting light passing through the first optical fiber module.

13. The system of claim 12, wherein the optical modulation module is a digital micromirror device, or a liquid crystal on silicon device.

14. A linear chromatic confocal microscopic system, comprising:
a light source for providing a detecting light;
a first optical fiber module, having one end coupled to the light source, and the other end for modulating the detecting light into a modulated light, wherein the first optical fiber module comprises:
a line slit coupled to the chromatic dispersion objective;
an optical fiber bundle, respectively coupled to the line slit and the light source, wherein a plurality of first optical fibers of the optical fiber bundle are arranged two-dimensionally to couple to the line slit; and
a position adjusting unit, selectively coupled to the optical fiber bundle or the line slit for adjusting a relative position between the optical fiber bundle and the line slit whereby one row of the two-dimensionally arranged first optical fibers is corresponding to the line slit;
a chromatic dispersion objective, coupled to the first optical fiber module, having at least two chromatic aberration lenses for modulating the modulated light into an axial chromatic dispersion light projecting onto an object and reflected from the object to form an object light, wherein the axial chromatic dispersion light comprises a plurality of sub line-type light fields having different focal lengths and corresponding wavelengths, respectively;
a second optical fiber module, having a plurality of second optical fibers aligned linearly for being coupled to the chromatic dispersion objective so as to spatially filter the object light, thereby forming a filtered light;
a spectrum image sensing unit coupled to the second optical fiber module for sensing the filtered light so as to form a spectrum image; and
an operation processing unit, electrically connected to the spectrum image sensing unit for receiving the spectrum image and performing a calculation to generate a line-type sectional profile with respect to the object.

15. The system of claim 14, wherein the plurality of the first optical fibers of the optical fiber bundle are arranged to form an area for coupling to the light source.

* * * * *